Figure 1:
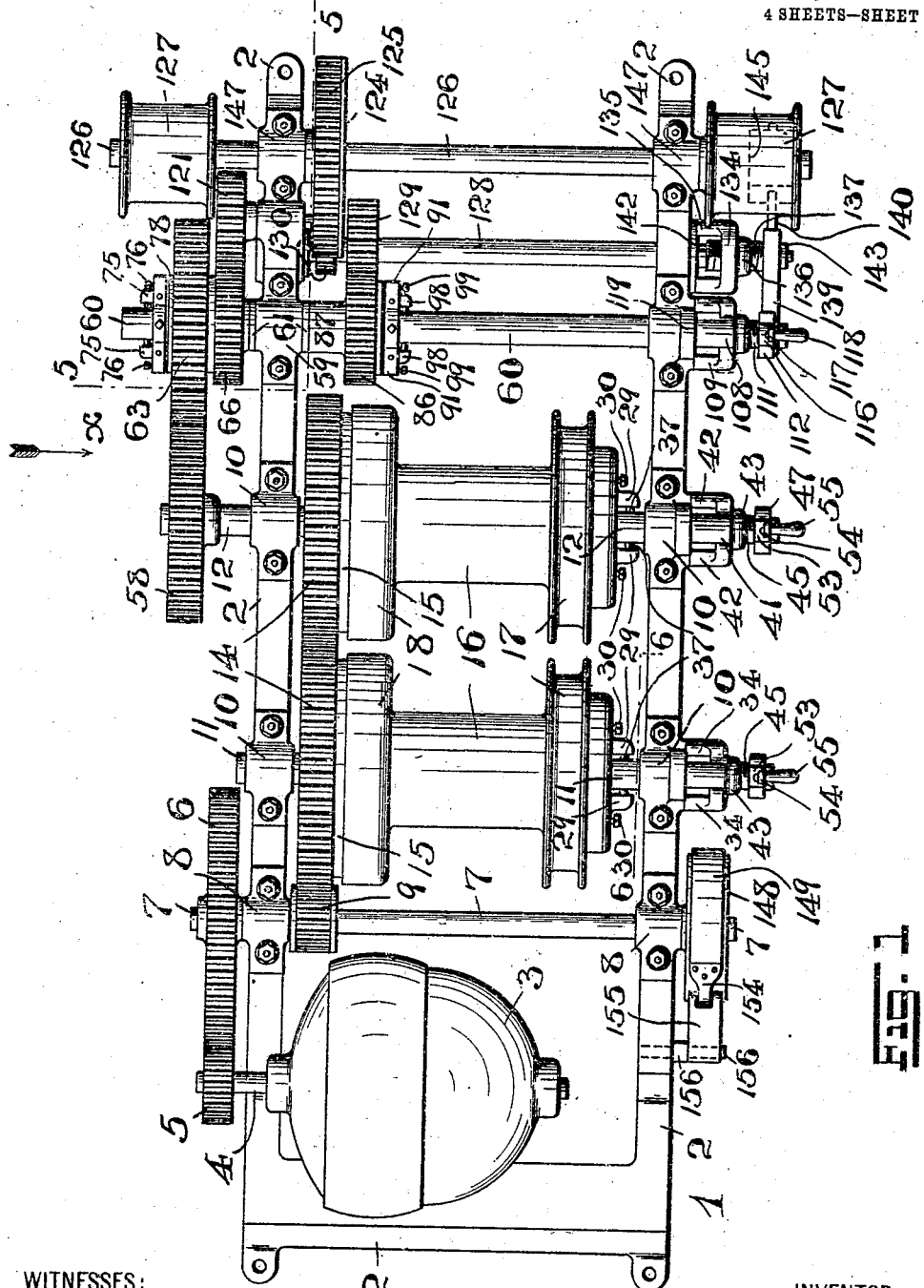

J. BOWLES.
HOISTING MACHINE.
APPLICATION FILED JUNE 1, 1908.

928,626.

Patented July 20, 1909.
4 SHEETS—SHEET 1.

WITNESSES:
F. H. W. Fraentzel
Anna H. Alter

INVENTOR:
James Bowles,
BY
Fraentzel and Richards,
ATTORNEYS

J. BOWLES.
HOISTING MACHINE.
APPLICATION FILED JUNE 1, 1908.
928,626.
Patented July 20, 1909.
4 SHEETS—SHEET 2.
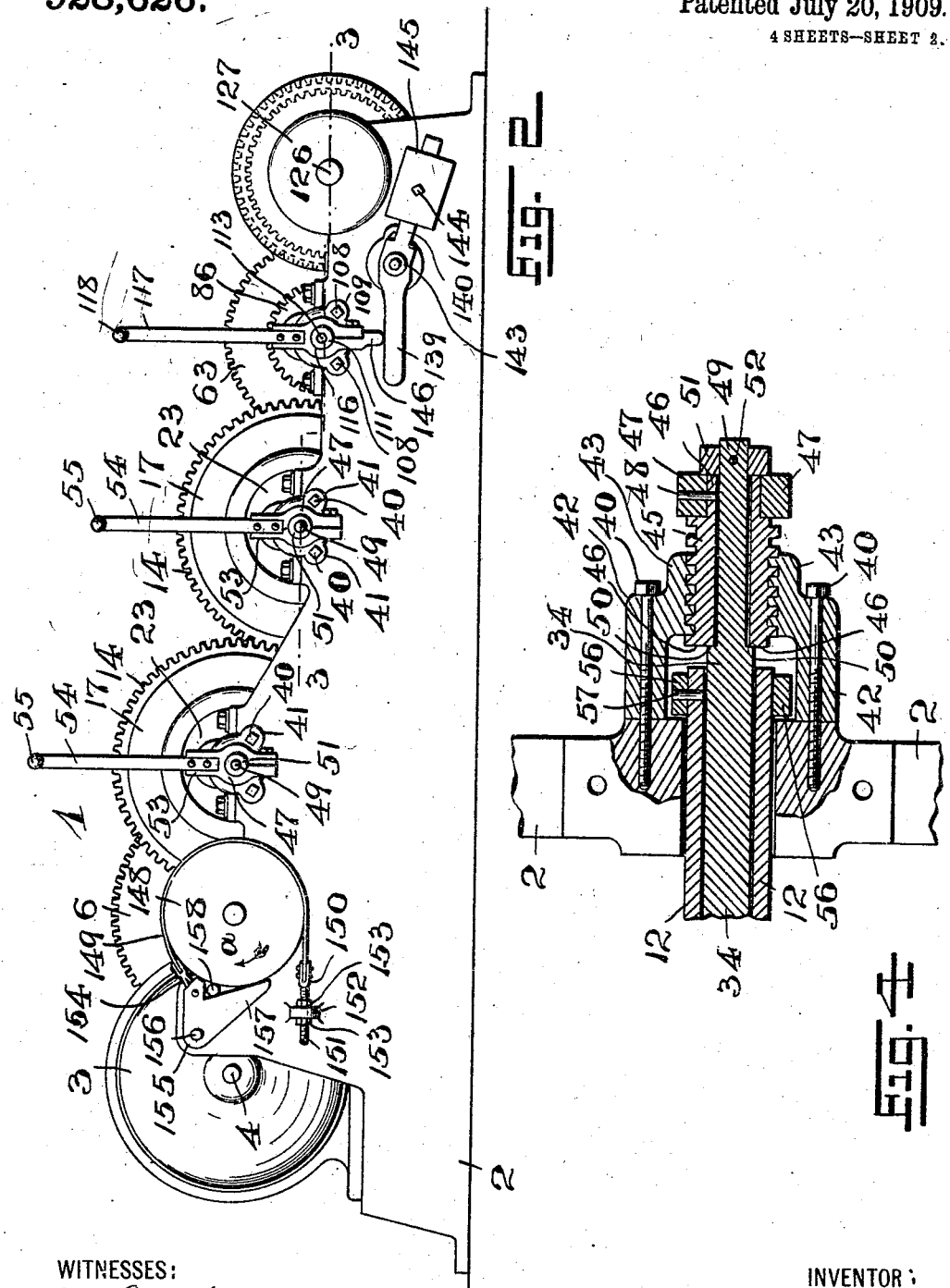
WITNESSES:
INVENTOR
James Bowles,
BY
Fraentzel and Richards
ATTORNEYS

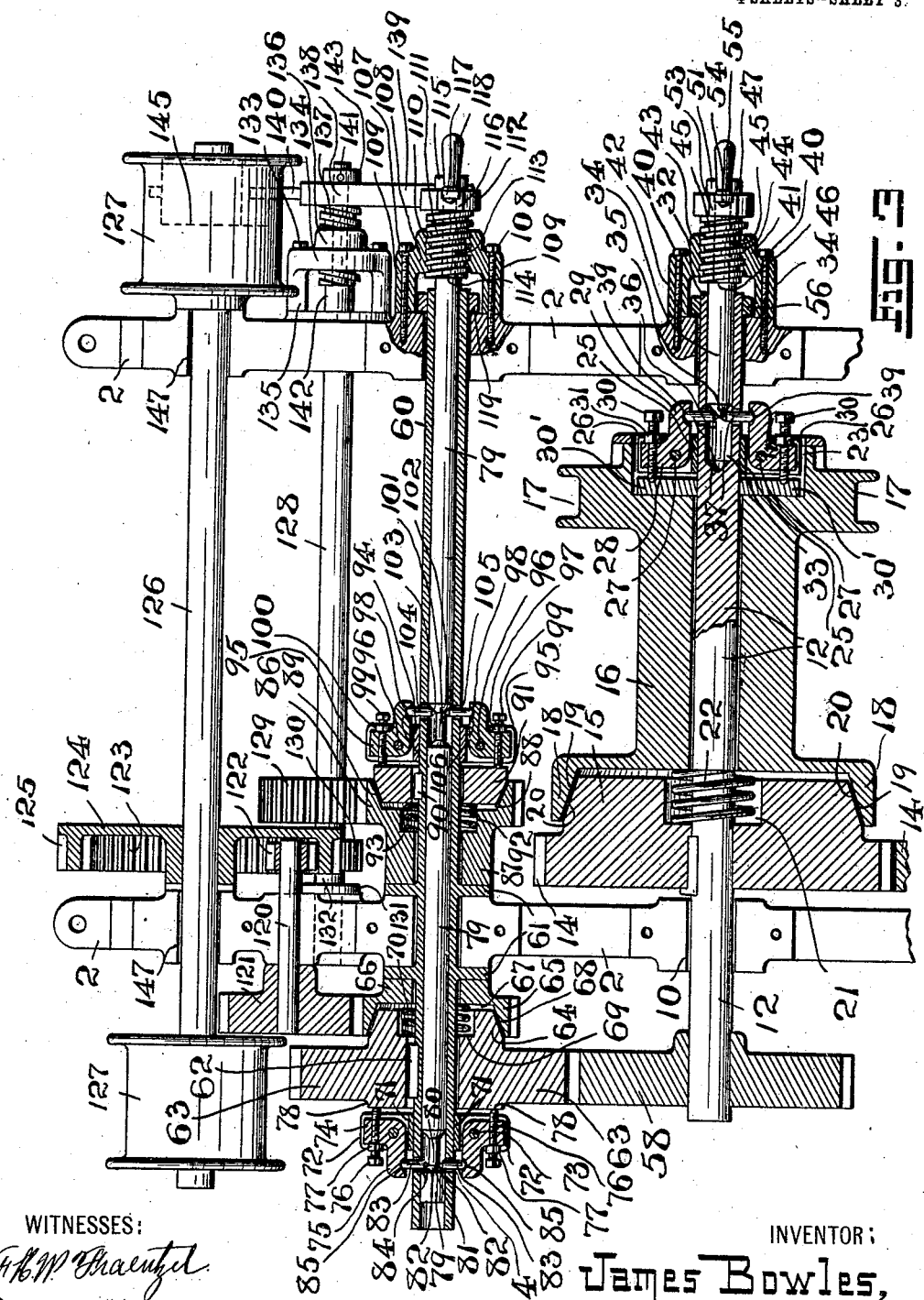

J. BOWLES.
HOISTING MACHINE.
APPLICATION FILED JUNE 1, 1908.

928,626.

Patented July 20, 1909.
4 SHEETS—SHEET 4.

WITNESSES:

INVENTOR:
James Bowles,
BY
Fraentzel and Richards,
ATTORNEYS.

UNITED STATES PATENT OFFICE.

JAMES BOWLES, OF HARRISON, NEW JERSEY.

HOISTING-MACHINE.

No. 928,626.  Specification of Letters Patent.  Patented July 20, 1909.

Application filed June 1, 1908. Serial No. 435,963.

*To all whom it may concern:*

Be it known that I, JAMES BOWLES, a citizen of the United States, residing at Harrison, in the county of Hudson and State of New Jersey, have invented certain new and useful Improvements in Hoisting-Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to power-transmission devices, and to hoisting machinery, derrick-machinery, and the like; and, the principal object of my present invention is to provide a simply constructed mechanism for the transmission of power, comprising a novel construction of friction clutches, and novel improved means for actuating the said friction-clutches, all with a view of producing an efficiently operating means which may be used in connection with the friction drums of a hoisting-machine; with the friction drums and turn-table mechanism of derrick-machinery; with elevator-drums, or other similar machinery; or, as a power-transmission for shafting; transmission-mechanism for automobiles and other similar machines; and, in fact, my invention is capable of use with machinery and mechanisms of the various kinds where one part is to be brought in operative frictional engagement with another part, for transmitting power from the one part to the other part, without interrupting or shutting off the main supply of the power.

Another object of my present invention is to provide a means for actuating the said friction clutches which, from the nature of its construction operates in such a manner so that friction in the main bearings, in which the drum or other mechanism with which said friction clutch is used, which is so frequently caused by jamming of parts of the mechanism when the clutch is operated, is entirely obviated, and the whole mechanism is allowed to run freely and smoothly in the main-bearings.

A further object of the present invention is to provide in connection with the power-transmission mechanism as above set forth, an automatically working safety-brake-mechanism which operates in conjunction therewith.

Other objects of this invention not at this time more particularly mentioned will be clearly understood from the following detailed description of the said invention.

With the various objects of the present invention in view, the same consists in the general arrangements and combinations of the devices and parts, as well as in the details of the construction of the same, all of which will be hereinafter more fully set forth, and then finally embodied in the clauses of the claims which are appended to and which form an essential part of this specification.

The invention is clearly illustrated in the accompanying drawings, in which:—

Figure 5:
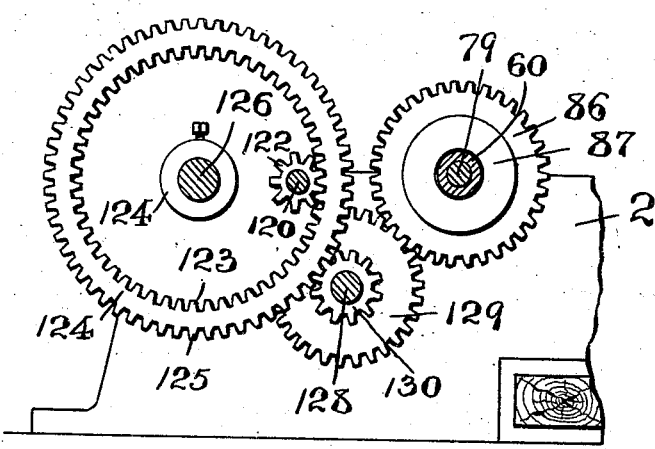
Figure 6:
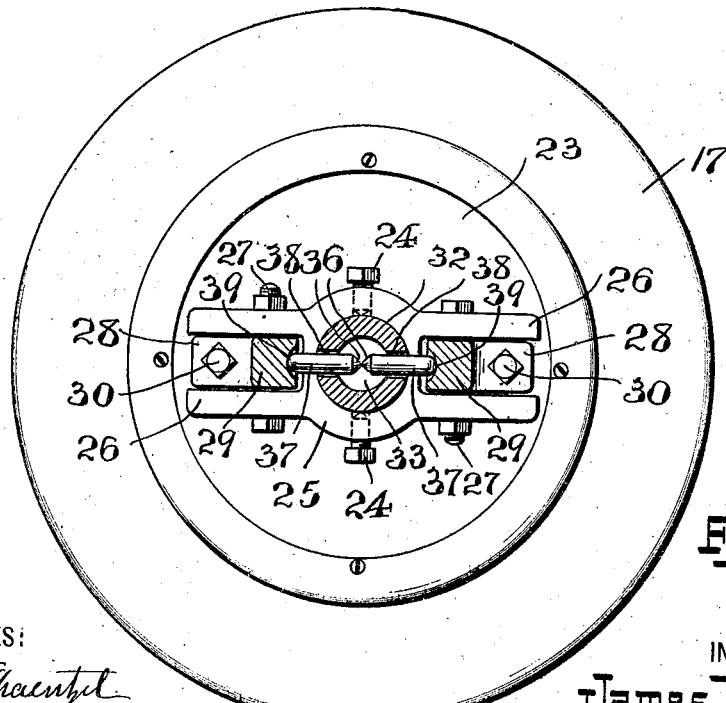

Figure 1 is a plan view of a hoisting and derrick mechanism provided with a power transmission mechanism embodying the principles of the present invention. Fig. 2 is a side elevation of the same. Fig. 3 is a detail horizontal section of the same, drawn upon an enlarged scale, said section being taken on line 3—3 in said Fig. 2. Fig. 4 is a detail horizontal section of a portion of the friction clutch operating mechanism, drawn upon an enlarged scale. Fig. 5 is a detail longitudinal vertical section taken on line 5—5 in said Fig. 1 and looking in the direction of the arrow $x$. Fig. 6 is a detail cross-section of the drum-shifting mechanism, taken on line 6—6 in said Fig. 1.

Similar characters of reference are employed in all of the above described views, to indicate corresponding parts.

Referring now to the several figures of the drawings, the reference-character 1 indicates the complete hoisting and derrick mechanism embodying the principles of this present invention, the same comprising a frame-work 2 upon which is mounted an electric motor 3, or any other prime-mover which may be desired, and secured to the free end of the driving-shaft 4 of the said motor 3 is a driving gear 5. This said driving-gear 5 meshes with a gear 6 which is secured to a shaft 7 mounted in cap-bearings 8, the same forming a part of the frame-work 2. Mounted upon this shaft 7 is a pinion 9. Mounted in cap-bearings 10, which also form a part of the frame-work 2 are a pair of shafts 11 and 12, and secured to each of the said shafts 11 and 12 by means of keys 13 are gears 14 which mesh with each other, and one of which meshes with the pinion 9. These gears 14 are each provided upon one side with a friction-cone 15. Slidably and loosely arranged upon each of the said shafts 11 and 12 are hoisting drums 16, each of the same being provided at one end with flanged portions 17 which may be used as braking surfaces for foot-brakes, if desired. The said twisting-drums 16 are further provided at their opposite ends with annular flanges 18, the same being formed with chamfered portions 19, which are adapted to engage with the inclined binding surfaces 20 of said friction-cones 15, when the hoisting-drums 16 are forced against the same in order to set the same in motion.

Each of the friction-cones 15 is provided with a cut-away or chambered portion 21 adapted to receive a coiled spring 22, a spring being arranged upon each shaft 11 and 12. The ends of these said coiled springs 22 are adapted to engage with the friction-cone 15 at one end and the hoisting drum 16 at the other in order to provide a tension, which, when the drums 16 are released from their operative engagement with the said friction-cones, 15 will tend to quickly separate the inclined annular binding surfaces 20 from the surface of the friction cones, so that the drums 16 may be quickly brought to a stop. Each hoisting-drum 16 is further provided at one end with a cut-away or chambered portion 23. Secured to the shafts 11 and 12, by means of set-screws 24 or in any other suitable manner, are yoke-pieces 25, provided with oppositely extending forked arms 26. Pivotally secured upon the bolt or pin 27 and between the members of the forked-arms 26 are dogs 28, provided with outwardly extending arms 29 which normally are parallel with the said shafts 11 and 12. Each of the said dogs 28 are provided with stud-screws 30, the same having lock-nuts 31 for locking them in their operative position with the said dogs 28. The free ends of these stud-screws 30 are adapted to engage with suitable disks 30' adapted to bind against the drums 16 and serve to push the said drums 16 forward until the same engage with the friction-cones 15, when the dogs 28 are operated by the mechanism and in the manner to be subsequently described.

The shafts 11 and 12 are provided with a chambered end 32, and slidably arranged in the chamber 33 thus formed is a shaft 34 provided at its inner end with a cone-shaped member 35. This said slidable-shaft 34 engages with the cone-shaped ends 36 of a pair of oppositely extending pins 37 which penetrate into the chamber 33 through the holes or perforations 38, the free or outer ends of said pins 37 being adapted to engage with a concave depression 39 arranged upon the outwardly extending arms 29 of the dogs 28.

Secured to the frame-work 2 by means of bolts 40, or in any other suitable manner, is a frame-work 41 which is provided with supporting legs or members 42 by means of which the same is connected to the frame-work 2. This said frame-work 41 is provided with a nut-like member 43 provided with an internal screw-thread 44, and arranged operatively in this nut-like member 43 is a hollow screw-threaded portion 45 provided at its outer end with a shoulder 46 upon which is secured a split-collar 47, which may be further secured by means of a pin 48, if desired. The said slidable shaft 34, above referred to, is provided with an extension 49 of smaller diameter, which also provides a shoulder 50 against which the inner end of the hollow screw-threaded portion 45 abuts, while the extension 49 passes through the said hollow-screw threaded portion 45; and, the same is designed to revolve therein. A collar 51 is secured upon the free end of the said extension 49, by means of a pin 52, or other suitable means. The split-collar 47 is provided with an upwardly extending arm 53 to which is bolted or otherwise secured an operating-lever 54, the same being provided with a handle-portion 55. The free ends of the chambered-portions of the shafts 11 and 12 extend through the cap-bearings 10 and are provided with holding collars 56 which are secured to said shafts by means of pins 57, or any other suitable means.

The operation of the mechanism above described, to force the annular binding surfaces 20 of the drums 16 upon the friction-cones 15, when it is desired to revolve the said drums, briefly is as follows:—The operating-lever 54 is thrown to the right, this causing the screw-threaded portion 45 to revolve in the screw-threaded nut-like member 43, and thereby moving the same in an inward direction, whereby the said screw-threaded portion 45 engages with the shoulder 50 of the slidable shaft 34 and causes the latter to move inwardly and the pins 37 to ride up onto the said slidable shaft 34. The said pins 37 are thus caused to move outwardly at right angles to the shafts 11 or 12, as the case may be, so as to engage with the outwardly extending arms 29 of the dogs 28, thereby causing the said dogs 28 to tip or swing upon their pivots and bring the disk 30' by means of the stud-screws 30 in contact with the hoisting drum 16, thereby shoving the same forward until the binding-surface thereof engages with the friction-cone 15 and is thus locked in that position while the drum 16 revolves. While this positively locks the drum 16 in engagement with the said friction-cone 15, it in no manner interferes with the free movement of the shafts 11 or 12, as the case may be, in the bearings 10, which continues to run smoothly and freely in the said bearings. Further-more, since all the parts, with the exception of the screw-thread portion 45, revolve with the said shaft 11 or 12, and since the extension 49 of the slidable shaft 34 revolves in the hollow portion of said screw-threaded portion 45, there is absolutely no frictional rubbing or sliding of any part of the clutching mechanism; and, the only friction possible is the ordinary friction of the revolving shaft, 11 or 12 in its bearings. As will be clearly understood from an inspection of the drawings and from the above description, this is a decided improvement and advantage over the old form of friction drums for hoisting and other types of machinery in which such friction-drums are used. Secured to the end of the shaft 12 upon the off-side of the frame-work 2 is a gear-wheel 58.

Mounted in a pair of cap-bearings 59, which form a part of the frame-work 2, is a hollow-shaft 60, this shaft 60 being provided with a pair of flanges 61 which are located one upon each side of the off cap-bearing 59, as is clearly illustrated in the accompanying drawings. Slidably secured upon this hollow-shaft 60, but so as to revolve therewith, by means of the key 62, is a gear-wheel 63 provided upon one side with a friction-cone 64. This said gear-wheel 63 meshes with the above mentioned gear-wheel 58.

Loosely arranged upon the hollow-shaft 60 is a gear-wheel 65, the hub 66 of which abuts against one of the flanges 61 of said hollow-shaft 60. The said gear-wheel 65 is formed with a chambered portion 67 which is provided with an inclined annular binding surface 68, which surface is adapted to engage operatively with the said friction-cone 64 of the gear-wheel 63, when the latter is brought in contact therewith. The said friction-cone 64 is provided with a chambered-portion 69 in which is arranged a helical spring 70 which engages both the friction-cone 64 and the gear-wheel 65 and serves to quickly separate the same when they are released from operative engagement with each other.

Secured to the hollow-shaft 60 in any suitable manner, is a yoke-piece 71, which is provided with oppositely extending forked-arms 72. Pivotally secured upon a bolt or pin 73 and between the members of the forked-arms 72 are dogs 74 formed with outwardly extending arms 75, which normally are parallel with the said hollow shaft 60. Each of the said dogs 74 are provided with stud-screws 76, the same having lock-nuts 77 arranged therewith, for locking them in their operative positions with the said dogs 74. The free-ends of these stud-screws 76 are adapted to engage with the portion 78 of the gear-wheel 63, and serve to push the gear-wheel 63 and its friction-cone 64 forward until the said cone 64 engages with the binding-surface 68 of the gear-wheel 65, when the dogs 74 are operated by the mechanism and in the manner to be subsequently described.

Slidably arranged in the hollow-shaft 60 is a shaft 79 which is provided with a reduced portion 80 of smaller diameter, and is further provided with chamfered portions 81, substantially, as shown. The left-hand chamfered portions 81 engage with the cone-shaped ends 82 of a pair of oppositely extending pins 83, which penetrate into the said hollow shaft 60 through holes or perforations 84, the free ends of said pins 83 being adapted to engage with a concave depression 85 arranged upon the outwardly extending arms 75 of the dogs 74.

Loosely arranged upon the hollow-shaft 60 is a gear-wheel 86, the hub-portion 87 of which abuts the other or opposite of said flanges 61 of the hollow-shaft 60. This gear-wheel 86 is formed with a chambered portion 88 which is provided with an inclined annular binding surface 89. Slidably secured upon the said hollow-shaft 60 by means of a key 90, but so as to revolve therewith, is a friction-cone 91 which is adapted to engage with the binding surface 89 of the gear-wheel 86, when the said friction-cone 91 is brought in contact with said surface 89. The gear-wheel 86 is provided with a chamfered portion 92 in which is arranged a coiled-spring 93 which engages both the said gear-wheel 86 and the said friction-cone 91 and serves to quickly separate the same when they are released from operative engagement with each other.

Secured to the hollow-shaft 60, in any suitable manner, is a yoke-piece 94, provided with oppositely extending forked arms 95. Pivotally secured upon a bolt or pin 96, and between the members of the forked-arms 95, are dogs 97, which are provided with outwardly extending arms 98, said arms being normally parallel with the said hollow shaft 60. Said dogs 97 are provided with stud-screws 99, the same having lock-nuts 100 arranged therewith, for locking them in their operative positions with the said dogs 97. The free ends of these stud-screws 99 are adapted to engage with the said friction-cone 91 forward until the same engages with cone 91 forward until the same engages with the binding-surface 89 of the gear-wheel 86, when the dogs 97 are operated by the mechanism and in the manner to be subsequently described.

The slidable shaft 79, above referred to, is provided with another reduced portion 101 of smaller diameter, and said shaft is further provided with chamfered portions 102, substantially as shown. The right-hand chamfered portion 102 engages with the cone-shaped ends 103 of a pair of oppositely extending pins 104, which penetrate into the hollow shaft 60 through holes or perforations 105, the free or outer ends of said pins 104 being adapted to engage with a concave depression 106 arranged upon the outwardly extending arms 98 of the dogs 97.

Secured to the frame-work 2 by means of bolts 107, or in any other suitable manner, is a frame-work 108 which is provided with supporting legs or members 109 by means of which the same is connected with the frame-work 2. This said frame-work 108 is provided with an internally screw-threaded nut-like member 110. Arranged in this nut-like member 110 is a hollow screw-threaded portion 111 which is provided at its outer end with a shoulder upon which is secured a split-collar 112. The said slidable shaft 79 is provided with an extension 113 of smaller diameter which also provides a shoulder 114 against which the inner end of the hollow screw-threaded portion 111 abuts, while the extension 113 passes through the said hollow screw-threaded portion 111 and is designed to revolve freely therein. A collar 115 is secured upon the free end of the extension 113 in any suitable manner.

The split-collar 112 is provided with an upwardly extending arm 116 to which is bolted, or otherwise secured, an operating lever 117, the same having a handle-portion 118. The free end of the hollow shaft 60 extends through the cap-bearings 59 and is provided with a holding collar 119 secured to said hollow shaft, in any suitable manner.

Mounted in a suitable bearing in the frame-work 2 is a short shaft 120 upon one end of which is secured a gear-wheel 121 which meshes with the gear-wheel 63, the other or opposite end of said shaft 120 being provided with a pinion 122 suitably secured thereto. This pinion 122 meshes with the internal teeth 120 of a double gear 124 which is also provided with external teeth 125. This double gear 124 is secured upon a shaft 126 which is mounted in a pair of cap-bearings which form a part of the frame-work 2. Secured to each of the free ends of said shaft 126 are drums 127.

Mounted in suitable bearings in the frame-work 2 is a shaft 128, and secured to this shaft 128 is a gear-wheel 130, which meshes with the external teeth 125 of the double gear 124. The said shaft 128 is further provided with a brake-disk 131 which is caused to act by frictional engagement with a boss 132 formed preferably integrally with the frame-work 2. Secured to the frame-work 2, by means of bolts 133, or in any other suitable manner, is a frame-work 134, which is provided with supportings legs 135, by means of which the same is connected to the said frame-work 2. This said frame-work 134 is provided with an internally screw-threaded nut-like member 136, and arranged in this nut-like member 136 is a hollow screw-threaded portion 137, the screw-thread of which is a left-handed thread. The said hollow screw-threaded portion 137 is provided upon its outer end with a shoulder upon which is secured a lever-member or element 138 which is provided with oppositely extending arms 139 and 140. The said shaft 128 is also made with an extension 141 of smaller diameter, which also provides a shoulder 142 against which the inner end of the hollow-screw-threaded portion 137 abuts, while the extension 141 passes through the said hollow screw-threaded portion 137 and is designed to revolve therein. A collar 143 is secured upon the free end of the extension 141 in any suitable manner. Secured to the arm 140 by means of a set-screw 144, or any other suitable means, is a weight 145.

The split-collar 112 is provided with a downwardly extending projection 146 on the free end thereof which is adapted to engage with the arm 139 of the lever-member 138.

Referring now to the hollow shaft 60 and the mechanism connected therewith and mounted thereon it will be clearly understood that the method of operating the friction clutches described therewith is the same as that described above in connection with the hoisting-drums 16. By throwing the operating lever 117 to the right the slidable shaft 79 is pushed inwardly and the friction-cone 91 is engaged operatively with the gear-wheel 86 and thereby operates the drums 127 in one direction by means of the gear-wheel 129, pinion 130 and external teeth 125 of the gear-wheel 124. When the operating lever 117 is thrown to the left, the slidable shaft 79 is pulled outwardly and the friction-cone 64 is engaged operatively with the gear-wheel 65, and thereby operates the drums 127 in the opposite direction by means of the gear-wheel 121 and pinion 122 which engages with the internal teeth 123 of the double gear-wheel 124. The said drums 127 are used for turning or swinging the derrick in connection with hoisting machinery.

When the operating lever 117 is in normal upright position, the downwardly extending projection 146 engages and pushes downwardly the arm 139 of the lever-member 38 and tips or lifts the weight 145 connected with the opposite arm 140. In this position the screw-threaded portion 137 has been turned so as to drive the shaft 128 forward, so that the brake-disk 131 is caused to operatively bind upon the boss 132 and thus lock the drums 127 and the shafts and connecting gears against turning. When, however, the operating lever 117 is operated to throw in either friction-clutch connected with the hollow-shaft 60, the said downwardly extending projection 146 is released from its holding engagement with the arm 139 of the lever-member 138, and the weight 145 on the other arm 140 drops; and, in so doing, operates the screw-threaded member 137 in the opposite direction to pull outwardly the shaft 128 and release the brake-disk 131 from its braking or binding engagement with the boss 132. The drums 127 are thereby allowed to be revolved by the gearing, etc., thrown in motion by the operation of either friction-clutch mechanism, all of which will be clearly understood from an inspection of the drawings, and more particularly of Fig. 3 thereof.

Referring now more particularly to Figs. 1 and 2, it will be seen that secured to the said shaft 7 is a disk-wheel 148, and surrounding this disk-wheel 148 is a brake-band 149, one end of which is secured to the forked receiving-end 150 of an adjustable holding screw 151 which is retained in a lug 152 formed upon the frame-work 2, and is locked in its adjusted position by means of the lock-nuts 153. The other or opposite end of said brake-band 149 is retained or secured by a connecting-link 154 which is pivotally secured to a swinging automatic brake-operator 155 which is pivoted upon a stud 156. The said brake-operator is provided with a downwardly extending member 157, the inner surface of which is tangent with the circumference of the disk-wheel 148, and arranged between this surface and the outer surface of the disk-wheel 148 is a roller 158. When the mechanism is operating normally to hoist a load, the disk-wheel 148 turns in the direction of the arrow $a$ and the roller 158 rolls freely and the brake-band 149 is loose upon the disk-wheel 148; but if for any reason, such as the sudden giving out of power, or the like, the mechanism should reverse its movement by reason of the weight being hoisted, and in consequence the disk-wheel should revolve in the opposite direction, the roller 158 would be forced downwardly and in so doing would force the downwardly extending member 157 away from the disk-wheel 148 and thus tips or turns the brake-operator 155 which draws the braking-band 149 tightly around the disk-wheel 148 and thus brings the mechanism to a quick and positive stop. This mechanism provides a safety emergency brake which is entirely automatic in its operation as will be clearly evident.

From the foregoing description of my present invention it will be clearly seen that I have provided a simple and operative, as well as a very efficient mechanism which is especially adapted for the purposes of this invention.

I am fully aware that various changes may be made in the general arrangements and combinations of the devices and parts as set forth in the accompanying specification without departing from the scope of this invention as defined in the appended claims. Hence I do not limit my invention to the exact arrangements and combinations of the devices and parts as described in the accompanying specification, nor do I confine myself to the exact details of the construction of the said parts as illustrated in the accompanying drawings.

I claim:—

1. In hoisting machine, the combination with a frame-work, of bearings in said frame-work, a shaft rotatably mounted in said bearings, said shaft being provided with a hollow or chambered portion having a pair of oppositely extending perforations in the walls thereof, a yoke-piece rigidly secured upon said shaft, a pair of dogs pivotally secured to said yoke-piece, an engaging element upon said shaft, pins loosely arranged in said oppositely extending portions, said pins having their outer end-portions in engagement with said dogs, and means within said hollow shaft-portion for moving said pins outwardly so as to oscillate said dogs and thereby actuate the said engaging element, substantially as and for the purposes set forth.

2. In hoisting machine, the combination with a frame-work, of bearings in said frame-work, a shaft rotatably mounted in said bearings, said shaft being provided with a hollow or chambered portion having a pair of oppositely extending perforations in the walls thereof, a yoke-piece rigidly secured upon said shaft, a pair of dogs pivotally secured to said yoke-piece, an engaging element upon said shaft, pins loosely arranged in said oppositely extending portions, said pins having their outer end-portions in engagement with said dogs, and a second shaft slidably arranged within the hollow or chambered part of said first-mentioned shaft, said second shaft having a reduced portion and being provided with a chamfered part adapted to be brought in engagement with the inner end-portions of said pins for moving them outwardly so as to oscillate said dogs and thereby actuate the said engaging element, substantially as and for the purposes set forth.

3. In hoisting machine, the combination with a frame-work, of bearings in said frame-work, a shaft rotatably mounted in said bearings, said shaft being provided with a hollow or chambered portion having a pair of oppositely extending perforations in the walls thereof, a yoke-piece rigidly secured upon said shaft, a pair of dogs pivotally secured to said yoke-piece, an engaging element upon said shaft, pins loosely arranged in said oppositely extending portions, said pins having their outer end-portions in engagement with said dogs, a stud-screw adjustably connected with each dog, and means within said hollow shaft-portion for moving said pins outwardly so as to oscillate said dogs and cause said stud-screws to engage with and actuate the said engaging element, substantially as and for the purposes set forth.

4. In hoisting machine, the combination with a frame-work, of bearings in said frame-work, a shaft rotatably mounted in said bearings, said shaft being provided with a hollow or chambered portion having a pair of oppositely extending perforations in the walls thereof, a yoke-piece rigidly secured upon said shaft, a pair of dogs pivotally secured to said yoke-piece, an engaging element upon said shaft, pins loosely arranged in said oppositely extending portions, said pins having their outer end-portions in engagement with said dogs, a stud-screw adjustably connected with each dog, and a second shaft slidably arranged within the hollow or chambered part of said first-mentioned shaft, said second shaft having a reduced portion and being provided with a chamfered part adapted to be brought in engagement with the inner end-portions of said pins for moving them outwardly so as to oscillate said dogs and cause said stud-screws to engage with and actuate the said engaging element, substantially as and for the purposes set forth.

5. In hoisting-machinery, or the like, the combination with a supporting frame-work, of bearings in said frame-work, one or more shafts rotatably mounted in said bearings, said shafts being each provided with a hollow or chambered end having a pair of oppositely extending perforations in the walls thereof, means for operatively connecting said shafts with a prime mover, friction-cones rigidly secured upon said shafts, hoisting-drums loosely and slidably arranged upon said shafts, said hoisting-drums being each provided with a binding surface, a yoke-piece rigidly secured to each of said shafts, a pair of dogs pivotally secured to each yoke-piece, a pair of pins adapted to engage the arms of said dogs and extend inwardly into the hollow or chambered ends of said shafts through the said perforations, and means for moving said pins outwardly to oscillate said dogs and thereby shift the said hoisting-drums so that said binding surfaces of said annular flanged ends thereof will engage with the said friction-cones for the purpose of rotating said hoisting-drum, substantially as and for the purposes set forth.

6. In hoisting-machinery, or the like, the combination with a supporting frame-work, of bearings in said frame-work, one or more shafts rotatably mounted in said bearings, said shafts being each provided with a hollow or chambered end having a pair of oppositely extending perforations in the walls thereof, means for operatively connecting said shafts with a prime-mover, friction-cones rigidly secured upon said shafts, hoisting drums loosely and slidably arranged upon said shafts, said hoisting-drums being each provided with an annular flanged end provided with a binding surface, a yoke-piece rigidly secured to each of said shafts, a pair of dogs pivotally secured to each yoke-piece, a pair of pins adapted to engage the arms of said dogs and extend inwardly into the hollow or chambered ends of said shafts through the said perforations, a slidable-shaft provided with a cone-shaped end adapted to engage with the inner ends of said pins, arranged in the hollow or chambered end of each of said shafts, and means for causing said slidable shaft to engage with and move outwardly the said pins to oscillate said dogs and thereby shift the said hoisting-drums so that said binding-surfaces of said annular flanged ends thereof will engage with said friction-cones for the purpose of rotating said hoisting-drums, substantially as and for the purposes set forth.

7. In hoisting-machinery, or the like, the combination with a supporting-frame-work, of bearings in said frame-work, one or more shafts rotatably mounted in said bearings, said shafts being each provided with a hollow or chambered end having a pair of oppositely extending perforations in the walls thereof, means for operatively connecting said shafts with a prime-mover, friction-cones rigidly secured upon said shafts, hoisting drums loosely and slidably arranged upon said shafts, said hoisting-drums being each provided with an annular flanged end provided with a binding surface, a yoke-piece rigidly secured to each of said shafts, a pair of dogs pivotally secured to each yoke-piece, a pair of pins adapted to engage the arms of said dogs and extend inwardly into the hollow or chambered end of said shafts through the said perforations, a slidable shaft provided with a cone-shaped end adapted to engage with the inner ends of said pins, arranged in the hollow or chambered end of each of said shafts, an extension of smaller diameter connected with the outer end of said slidable shaft, and forming a shoulder in connection therewith, a nut-member supported by leg-members secured to said frame-work, a hollow screw-threaded portion operatively arranged in said nut-member, said hollow screw-threaded portion engaging with said shoulder in connection with said slidable-shaft, and said extension being rotatably arranged in said hollow screw-threaded portion, and means for operating said hollow-screw-threaded portion to cause said slidable-shaft to engage with and move outwardly the said pins to oscillate said dogs and thereby shift the said hoisting-drums so that said binding-surfaces of said annular flanged ends thereof will engage with said friction-cones for the purpose of rotating said hoisting-drums, substantially as and for the purposes set forth.

8. In hoisting-machinery, or the like, the combination with a supporting frame-work, of bearings in said frame-work, one or more shafts rotatably mounted in said bearings, said shafts being each provided with a hollow or chambered end having a pair of oppositely extending perforations in the walls thereof, means for operatively connecting said shafts with a prime-mover, friction-cones rigidly secured upon said shafts, hoisting-drums loosely and slidably arranged upon said shafts, said hoisting-drums being each provided with an annular flanged end provided with a binding surface, a yoke-piece rigidly secured to each of said shafts, a pair of dogs pivotally secured to each yoke-piece, a pair of pins adapted to engage the arms of said dogs and extend inwardly into the hollow or chambered ends of said shafts through the said perforations, a slidable shaft provided with a cone-shaped end adapted to engage with the inner ends of said pins, arranged in the hollow or chambered end of each of said shafts, an extension of small diameter connected with the outer end of said slidable shaft, and forming a shoulder in connection therewith, a nut-member supported by leg-members secured to said frame-work, a hollow screw-threaded portion operatively arranged in said nut-member, said hollow screw-threaded portion engaging with said shoulder in connection with said slidable-shaft, and said extension being rotatably arranged in said hollow screw-threaded portion, and means for operating said hollow screw-threaded portion to cause said slidable-shaft to engage with and move outwardly the said pins to oscillate said dogs and thereby shift the said hoisting-drums so that said binding-surfaces of said annular flanged ends thereof will engage with said friction-cones for the purpose of rotating said hoisting-drums, said means comprising a split-collar secured rigidly to said hollow screw-threaded portion and a lever arm provided with a handle connected therewith, substantially as and for the purposes set forth.

9. In hoisting-machinery, or the like, the combination with a supporting frame-work, of hoisting drums operatively mounted on said frame-work, means for connecting said hoisting drums operatively with a prime-mover, a hollow shaft mounted in bearings in said frame-work, said hollow shaft being provided with oppositely extending perforations in the walls thereof, means for operatively connecting said hollow-shaft with said prime-mover, a pair of friction-cones slidably secured upon said hollow shaft, a pair of gears loosely arranged on said hollow-shaft, a pair of derrick-boom drums secured on a shaft mounted in said frame-work, means for operatively connecting said loosely mounted gears with said derrick-boom drums, a pair of yoke-pieces rigidly secured on said hollow-shaft one adjacent to each of said friction-cones, a pair of dogs pivotally connected to each yoke-piece, stud-screws arranged in each dog and adapted to engage with said friction-cones, pins slidably arranged in the perforations of said hollow shaft, the outer end of said pins being adapted to engage with the arms of said dogs, a slidable-shaft provided with cutaway portions, said slidable shaft being adapted to engage with the inner ends of said pins, and means for causing said slidable shaft to engage with and move outwardly said pins to oscillate said dogs and thereby shift either one or the other of said friction cones in operative contact with said loosely mounted gears for the purpose of rotating said derrick-boom drums, substantially as and for the purposes set forth.

10. In hoisting-machinery, or the like, the combination with a supporting frame-work, of hoisting drums operatively mounted on said frame-work, means for connecting said hoisting drums operatively with a prime-mover, a hollow shaft mounted in bearings in said frame-work, said hollow shaft being provided with oppositely extending perforations in the walls thereof, means for operatively connecting said hollow-shaft with said prime-mover, a pair of friction-cones slidably secured upon said hollow shaft, a pair of gears loosely arranged on said hollow-shaft, a pair of derrick-boom drums secured on a shaft mounted in said frame-work, means for operatively connecting said loosely mounted gears with said derrick-boom drums, a pair of yoke-pieces rigidly secured on said hollow-shaft one adjacent to each of said friction-cones, a pair of dogs pivotally connected to each yoke-piece, stud-screws arranged in each dog and adapted to engage with said friction-cones, pins slidably arranged in the perforations of said hollow shaft, the outer ends of said pins being adapted to engage with the arms of said dogs, a slidable-shaft provided with cutaway portions, said slidable shaft being adapted to engage with the inner ends of said pins, an extension of smaller diameter connected with the outer end of said slidable shaft and forming a shoulder in connection therewith, a nut-member supported by leg-members secured to said frame-work, a hollow screw-threaded portion arranged in said nut-member and engaging with said shoulder, said extension being rotatably arranged in said hollow-screw-threaded portion, a collar rigidly secured to the free end of said extension and abutting said hollow-screwthreaded portion, and means for operating said hollow-screw-threaded portion to cause said slidable-shaft to engage with and move outwardly said pins to oscillate said dogs and thereby shift either one or the other of said friction-cones in operative contact with said loosely mounted gears for the purpose of rotating said derrick-boom drums, substantially as and for the purposes set forth.

11. In hoisting-machinery, or the like, the combination with a supporting frame-work, of hoisting drums operatively mounted on said frame-work, means for connecting said hoisting drums operatively with a prime-mover, a hollow shaft mounted in bearings in said frame-work, said hollow shaft being provided with oppositely extending perforations in the walls thereof, means for operatively connecting said hollow-shaft with said prime-mover, a pair of friction-cones slidably secured upon said hollow shaft, a pair of gears loosely arranged on said hollow-shaft, a pair of derrick-boom drums secured on a shaft mounted in said frame-work, means for operatively connecting said loosely mounted gears with said derrick-boom drums, a pair of yoke-pieces rigidly secured on said hollow-shaft one adjacent to each of said friction-cones, a pair of dogs pivotally connected to each yoke-piece, stud-screws arranged in each dog and adapted to engage with said friction-cones, pins slidably arranged in the perforations of said hollow shaft, the outer ends of said pins being adapted to engage with the arms of said dogs, a slidable-shaft provided with cut-away portions, said slidable shaft being adapted to engage with the inner ends of said pins, an extension of smaller diameter connected with the outer end of said slidable shaft and forming a shoulder in connection therewith, a nut-member supported by leg-members secured to said frame-work, a hollow screw-threaded portion arranged in said nut-member and engaging with said shoulder, said extension being rotatably arranged in said hollow-screw-threaded portion, a collar rigidly secured to the free end of said extension and abutting said hollow screw-threaded portion, and means for operating said hollow-screw-threaded portion to cause said slidable-shaft to engage with and move outwardly said pins to oscillate said dogs and thereby shift either one or the other of said friction-cones in operative contact with said loosely mounted gears for the purpose of rotating said derrick-boom drums, said means comprising a split-collar secured rigidly to said hollow screw-threaded portion and a lever-arm provided with a handle connected therewith, substantially as and for the purposes set forth.

12. In hoisting-machinery, or the like, the combination with a supporting frame-work, of hoisting drums operatively mounted on said frame-work, means for connecting said hoisting drums with a prime-mover, a hollow shaft mounted in bearings in said frame-work, said hollow shaft being provided with perforations in the walls thereof, means for operatively connecting said hollow shaft with said prime-mover, a pair of friction-cones slidably secured on said hollow-shaft, a pair of gears loosely arranged on said hollow shaft, a shaft rotatably mounted in said frame-work, a gear-wheel secured on said shaft adapted to mesh with one of said loosely mounted gears on said hollow-shaft, a pinion on said shaft, a drum-shaft rotatably mounted in said frame-work, a pair of derrick-boom drums secured thereto, a gear provided with internal and external gear-teeth secured on said drum shaft, said external gear-teeth being adapted to engage with said pinion, a short shaft rotatably mounted in said frame-work, a gear-wheel secured on said short shaft adapted to mesh with the other of said loosely mounted gear wheels on said hollow shaft, a pinion secured on said short shaft and adapted to mesh with the internal teeth of said gear secured on said drum-shaft, a pair of yoke-pieces rigidly secured on said hollow-shaft one adjacent to each of said friction-cones, a pair of dogs pivotally connected to each yoke-piece, stud-screws arranged in each dog and adapted to engage with said friction-cones, pins slidably arranged in the perforations of said hollow-shaft, the outer ends of said pins being adapted to engage with the arms of said dogs, a slidable shaft provided with cutaway portions, said slidable-shaft being adapted to engage with the inner ends of said pins, an extension of smaller diameter connected with the outer ends of said slidable shaft and forming a shoulder, a nut-member secured to said frame-work, a hollow screw-threaded portion arranged in said nut-member and engaging said shoulder, said extension being rotatably arranged in said hollow screw-threaded portion, a collar rigidly secured to the free end of said extension and abutting said hollow screw-threaded portion, a split-collar secured rigidly to said hollow screw-threaded portion and a lever-arm provided with a handle connected therewith, substantially as and for the purposes set forth.

In testimony, that I claim the invention set forth above I have hereunto set my hand this 25th day of May, 1908.

JAMES BOWLES.

Witnesses:
FREDK C. FRAENTZEL,
GEORGE D. RICHARDS.